(12) United States Patent
Quelch

(10) Patent No.: US 6,882,943 B1
(45) Date of Patent: Apr. 19, 2005

(54) SYSTEM, METHOD AND COMPUTER PROGRAM PRODUCT FOR CONFIGURING POWER SUPPLY APPARATUS

(75) Inventor: Paul Jonathan Quelch, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 10/674,301

(22) Filed: Sep. 29, 2003

(51) Int. Cl.[7] .............................................. G01R 19/00
(52) U.S. Cl. ..................................... 702/64; 323/354
(58) Field of Search ..................... 702/64; 219/130.21; 315/225; 323/354; 363/63.95

(56) References Cited

U.S. PATENT DOCUMENTS 6,054,847 A * 4/2000 Garcia et al. ............... 323/354
6,239,407 B1 * 5/2001 Thommes ............... 219/130.21

* cited by examiner

Primary Examiner—John Barlow
Assistant Examiner—Stephen J. Cherry
(74) Attorney, Agent, or Firm—Robert M. Sullivan

(57) ABSTRACT

A system, method and computer program for configuring power supply apparatus to supply a voltage optimized to tolerate a range about a nominal operating voltage of a device comprises a tester to test and communicate to a comparator a present utility voltage value. The comparator compares the present utility voltage with a present nominal operating voltage of the device. A configurator responds to the present utility voltage falling within an upper half of a first range having a centre point higher than the present nominal operating voltage and lower than an upper out-of-tolerance voltage of the device or within a lower half of a second range having a centre point lower than the present nominal operating voltage and higher than a lower out-of-tolerance voltage of the device, by configuring the power supply apparatus to supply a voltage respectively within the first range or the second range.

18 Claims, 3 Drawing Sheets

SYSTEM, METHOD AND COMPUTER PROGRAM PRODUCT FOR CONFIGURING POWER SUPPLY APPARATUS

FIELD OF THE INVENTION

This invention relates to power supply apparatus and methods for operation thereof, and more particularly to the field of uninterruptible power supply apparatus such as is used in conjunction with data processing equipment.

BACKGROUND OF THE INVENTION

An uninterruptible power supply (UPS) is well-known in the art as a device which accepts an electrical power input from the utility supply and supplies continuous, good quality electrical power to an appliance. The UPS's output supply to the appliance is unaffected by variations or interruptions to the utility supply. UPSs generally have communication with the appliance so that the status of the UPS may be monitored.

Some types of UPS have a configurable output voltage which can be set to the voltage required by the appliance and normally this would match the nominal voltage of the utility supply. The person installing the UPS must have knowledge of the local utility's nominal voltage and then spend time setting this voltage on each UPS being installed. There is a risk that the wrong voltage will be set or even that the voltage will not be checked and left at the factory default if the UPS appears to be functioning correctly at the time of installation.

Some types of UPS provide a bypass function which operates if the UPS detects an internal failure. The bypass function connects the power input of the appliance directly to the utility supply, thus bypassing the failed component in the UPS. However, there is a danger that when the bypass function operates the utility supply voltage is not within the range required by the appliance. To warn of this potential condition some UPSs will raise an alarm which indicates that, should the UPS need to bypass itself, the supply to the appliance will be out of voltage range. Appliances for which a continuous supply of power is critical may be designed to perform a controlled shutdown in the event of this alarm being raised so that a subsequent UPS failure would not result in an instant loss of power.

For convenience the voltage range used to raise the alarm described above may be calculated as a fixed percentage deviation from this nominal output setting. This means that a where such a UPS is shipped to a global market it must be configured to the local utility voltage to avoid this alarm being raised unnecessarily during normal operation.

While this alarm is appropriate for appliances which have a narrow range of acceptable input voltages, most data processing equipment will accept a much wider range of input voltages than any particular range implemented by the UPS. This means that the alarm will be raised even though the utility voltage is within the range acceptable by most data processing equipment. Even after the nominal voltage has been set correctly there may still be problems if, for example, the utility voltage varies by more than the range implemented by the UPS or the installation has a backup generator which supplies a different voltage from the utility. In these cases the UPS would raise an alarm when, in fact, the input voltage to the UPS is quite acceptable to the appliance.

One solution would be for the appliance to ignore the alarm raised by the UPS, but this has a number of drawbacks. The UPS will give a visual and audible warning of the alarm which may confuse the user if the appliance takes no action. In extreme conditions the utility voltage may really be outside the range acceptable to the appliance in which case a UPS failure would cause instant loss of power to the appliance.

A need therefore exists for an apparatus and method for configuration of a UPS wherein the above-mentioned disadvantage(s) may be alleviated.

STATEMENT OF INVENTION

In accordance with a first aspect of the present invention there is provided a system for configuring a power supply apparatus to supply a voltage optimized to tolerate a voltage range about a nominal operating voltage of a device, and comprising: a utility voltage test component operable to test and communicate to a comparison component a present utility voltage value; said comparison component operable to compare said present utility voltage value with a present nominal operating voltage value of said device; a configuring component in data communication with said comparison component and responsive to said present utility voltage value falling within an upper half of a first range having a centre point higher than said present nominal operating voltage value and lower than an upper out-of-tolerance voltage value of said device, configuring said power supply apparatus to supply power at a voltage within said first range; and said configuring component further responsive to said present utility voltage value falling within a lower half of a second range having a centre point lower than said present nominal operating voltage value and higher than a lower out-of-tolerance value of said device, configuring said power supply apparatus to supply power at a voltage within said second range.

A system according to the first aspect preferably further comprises a hysteresis component for delaying operation of said configuring component until a threshold voltage value difference is signalled by said comparison component.

Preferably, said power supply apparatus is an uninterruptible power supply.

Preferably, said device comprises a data-processing device.

Preferably, said power supply apparatus further comprises an alarm component operable to signal an alarm responsive to said present utility voltage value falling one of lower than said lower out-of-tolerance value and higher than said higher out of tolerance value.

Preferably, said power supply apparatus further comprises a bypass circuit to connect said device directly to said utility supply voltage in case of failure of said power supply apparatus.

According to a second aspect of the present invention, there is provided a method for configuring a power supply apparatus to supply a voltage optimized to tolerate a voltage range about a nominal operating voltage of a device, and comprising the steps of: testing by a utility voltage test component and communicating to a comparison component a present utility voltage value; comparing, by said comparison component, said present utility voltage value with a present nominal operating voltage value of said device; responsive to said present utility voltage value falling within an upper half of a first range having a centre point higher than said present nominal operating voltage value and lower than an upper out-of-tolerance voltage value of said device, configuring, by a configuring component, said power supply apparatus to supply power at a voltage within said first range; and responsive to said present utility voltage value falling within a lower half of a second range having a centre point lower than said present nominal operating voltage value and higher than a lower out-of-tolerance value of said device, configuring, by said configuring component, said power supply apparatus to supply power at a voltage within said second range.

A method according to the second aspect preferably further comprises a step of delaying operation of said configuring component via a hysteresis algorithm until a threshold voltage value difference is signalled by said comparison component.

Preferably, said power supply apparatus is an uninterruptible power supply.

Preferably, said device comprises a data-processing device.

Preferably, said power supply apparatus further comprises an alarm component operable to signal an alarm responsive to said present utility voltage value falling one of lower than said lower out-of-tolerance value and higher than said higher out of tolerance value.

Preferably, said power supply apparatus further comprises a bypass circuit to connect said device directly to said utility supply voltage in case of failure of said power supply apparatus.

According to a third aspect of the present invention, there is provided a computer program product, tangibly embodied in a computer-readable medium, for configuring a power supply apparatus to supply a voltage optimized to tolerate a voltage range about a nominal operating voltage of a device, and comprising the computer program code steps of: testing by a utility voltage test component and communicating to a comparison component a present utility voltage value; comparing, by said comparison component, said present utility voltage value with a present nominal operating voltage value of said device; responsive to said present utility voltage value falling within an upper half of a first range having a centre point higher than said present nominal operating voltage value and lower than an upper out-of-tolerance voltage value of said device, configuring, by a configuring component, said power supply apparatus to supply power at a voltage within said first range; and responsive to said present utility voltage value falling within a lower half of a second range having a centre point lower than said present nominal operating voltage value and higher than a lower out-of-tolerance value of said device, configuring, by said configuring component, said power supply apparatus to supply power at a voltage within said second range.

The computer program product of the third aspect preferably further comprises a computer program code step of delaying operation of said configuring component via a hysteresis algorithm until a threshold voltage value difference is signalled by said comparison component.

Preferably, said power supply apparatus is an uninterruptible power supply.

Preferably, said device comprises a data-processing device.

Preferably, said power supply apparatus further comprises an alarm component operable to signal an alarm responsive to said present utility voltage value falling one of lower than said lower out-of-tolerance value and higher than said higher out of tolerance value.

Preferably, said power supply apparatus further comprises a bypass circuit to connect said device directly to said utility supply voltage in case of failure of said power supply apparatus.

It is an advantage of the several embodiments of the present invention that where a UPS with the features described above is used to supply power to an appliance such as a computer and there is provided a data link between the UPS and the computer, the computer can reconfigure the UPS's nominal operating voltage as necessary depending on the utility input voltage measured by the UPS and made available via the data link. The utility voltage measurement is read at regular intervals by the computer and if it is found to have varied such that a different nominal operating voltage is more suitable then the UPS is reconfigured via the data link to operate at the new voltage.

The embodiments of the present invention thus advantageously allow the utility voltage to vary over the entire range acceptable to the appliance without the UPS raising an alarm. This removes the need for the UPS to be configured manually at the time of installation; reducing time and cost. It will also eliminate or at least alleviate the risk of misconfiguration and will autonomically handle changes in the utility supply that lie within a tolerable range for the device, thus leading to lower support costs.

BRIEF DESCRIPTION OF THE DRAWINGS

A preferred embodiment of the present invention will now be described, by way of example only, with reference to the appended drawings, in which.

DETAILED DESCRIPTION OF THE PREFERRED EMBODIMENT

Figure 1A:
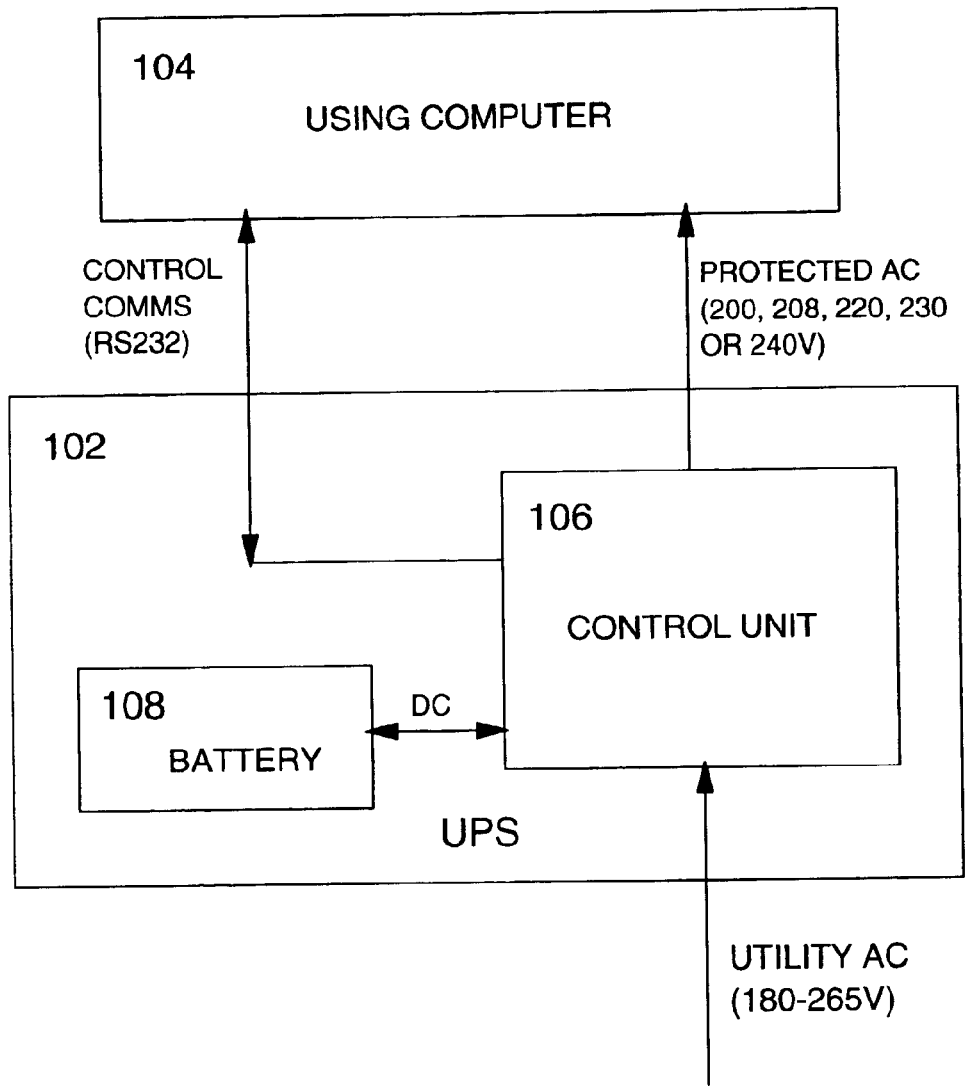
FIG. 1a is a schematic diagram showing the general layout of a system within which preferred embodiments of the present invention may be implemented.

FIG. 1a is a schematic diagram showing the general layout of a system within which preferred embodiments of the present invention may be implemented. A device, such as using computer 104, is supplied with a protected AC voltage of (for example) 200, 208, 220, 230 or 240 V by UPS 102.

UPS 102 takes as input a utility AC voltage which may (for example) vary from 180 to 265 V. UPS 102 is provided with a back-up battery 108, capable of supplying a DC voltage in emergencies involving loss of power at the utility AC input supply. UPS 102 is further provided with a control unit 106, which may conventionally be used (for example) to switch from utility AC input to battery DC input, to initiate a complete bypass of the UPS in case of a failure, or to sound an alarm in case of a potential failure that might require operator action. It will be clear to one skilled in the art that the "using computer" of the presently described embodiment could be substituted for by any power-consuming appliance or device.

Figure 1B:
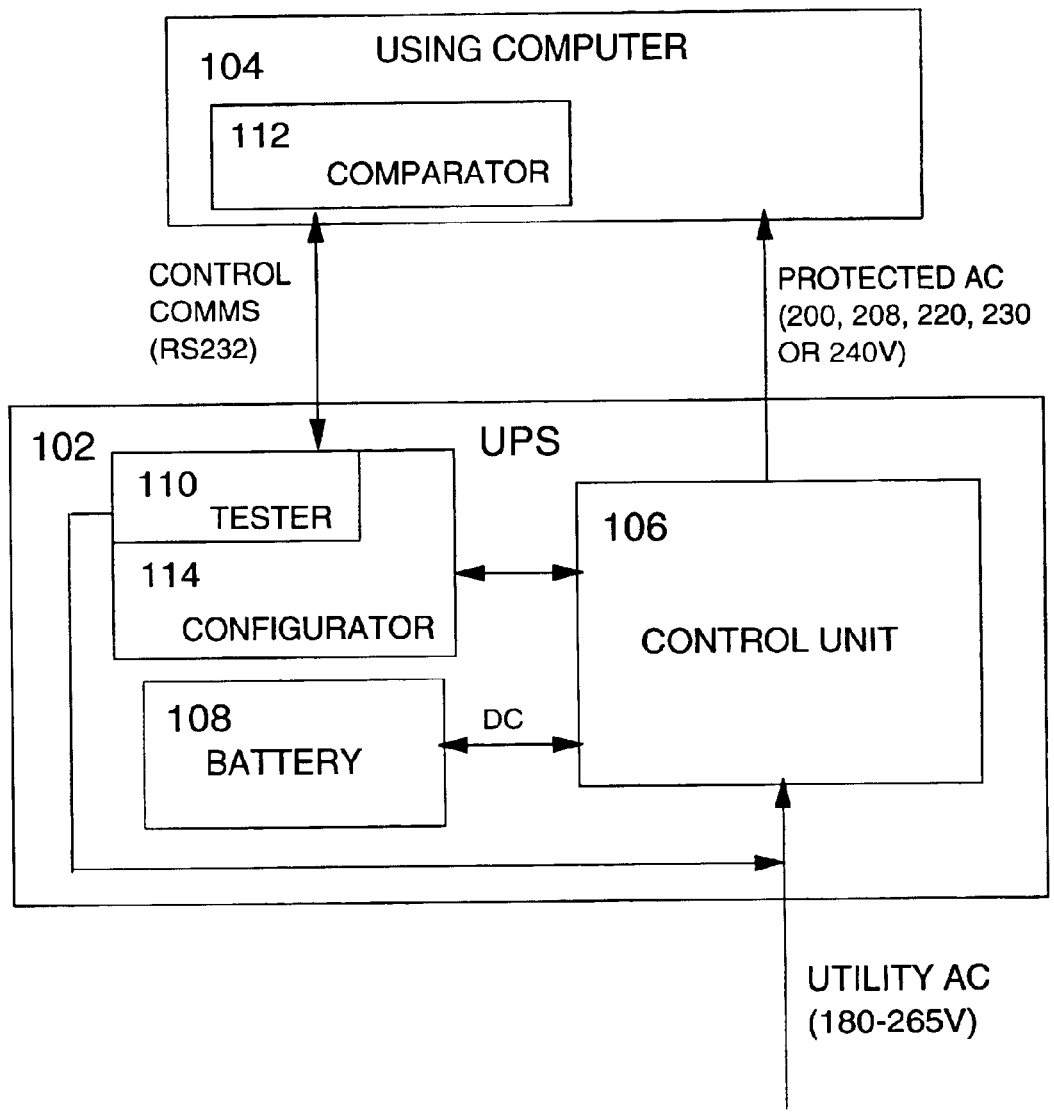
FIG. 1b is a schematic diagram showing a more detailed view of a system of components according to a preferred embodiment of the present invention.

FIG. 1b is a schematic diagram showing a more detailed view of a system of components according to a preferred embodiment of the present invention. Within UPS 102 there is provided tester 110, operable to test, possibly via control unit 106, or possibly (as illustrated) by direct testing access, the present input utility voltage. Tester 110 is operable to communicate the resulting input utility voltage value to comparator 112 at using computer 104 via, in the present embodiment, the control communications RS232 link. Comparator 112 is operable to read a configured nominal voltage and to compare the utility input voltage therewith and also with the next higher and next lower ranges of acceptable voltages for the using computer 104. By "ranges of acceptable voltages" is meant, "ranges of voltages that fall between an upper out-of-tolerance voltage and a lower out-of-tolerance voltage". Should these bounds of tolerance be breached, the power supply apparatus should behave in its conventional manner by, for example, raising an alarm, breaking the circuit to protect the device, or the like. One skilled in the art will readily understand that there is a range of variant behaviors available to the system under these circumstances.

In the case of a utility input voltage that lies within the upper half of the next higher range of acceptable voltages for the device, comparator returns this information, in the form of a request to configurator 114, at UPS 102. Configurator 114 is operable thereafter to configure the UPS 102 to supply voltage within the next higher range. This is achieved by indicating to the UPS 102 that the nominal operating voltage of the using computer 104 is now equal to the value lying at the centre of the higher range. Again, the voltage ranges involved must fall within the upper and lower tolerance levels for the device, as described above.

Conversely, in the case of a utility input voltage that lies within the lower half of the next lower range of acceptable voltages for the device, comparator returns this information, in the form of a request to configurator 114, at UPS 102. Configurator 114 is operable thereafter to configure the UPS 102 to supply voltage within the next lower range. This is achieved by indicating to the UPS 102 that the nominal operating voltage of the using computer 104 is now equal to the value lying at the centre of the lower range, and that UPS 102 should adjust its output voltage to the using computer 104 accordingly.

Again, the voltage ranges involved must fall within the upper and lower tolerance levels for the device, as described above. In the event that they do not, the method of the present invention should default to the conventional behavior of the system provided for such an eventuality.

One or more computers can thus be supplied with power by a UPS which implements the following features: a data link to the computers through which status information is provided by the UPS and commands to reconfigure the UPS may; be sent from the computers; a bypass circuit; and an alarm to warn that the utility voltage is out of range. The computers are pre-programmed with their own input voltage range and with details of the particular UPS's implemented nominal operating voltage ranges. Upon this infrastructure, as shown in FIG. 2, a method of operation according to a preferred embodiment of the present invention may be practised.

Figure 2:
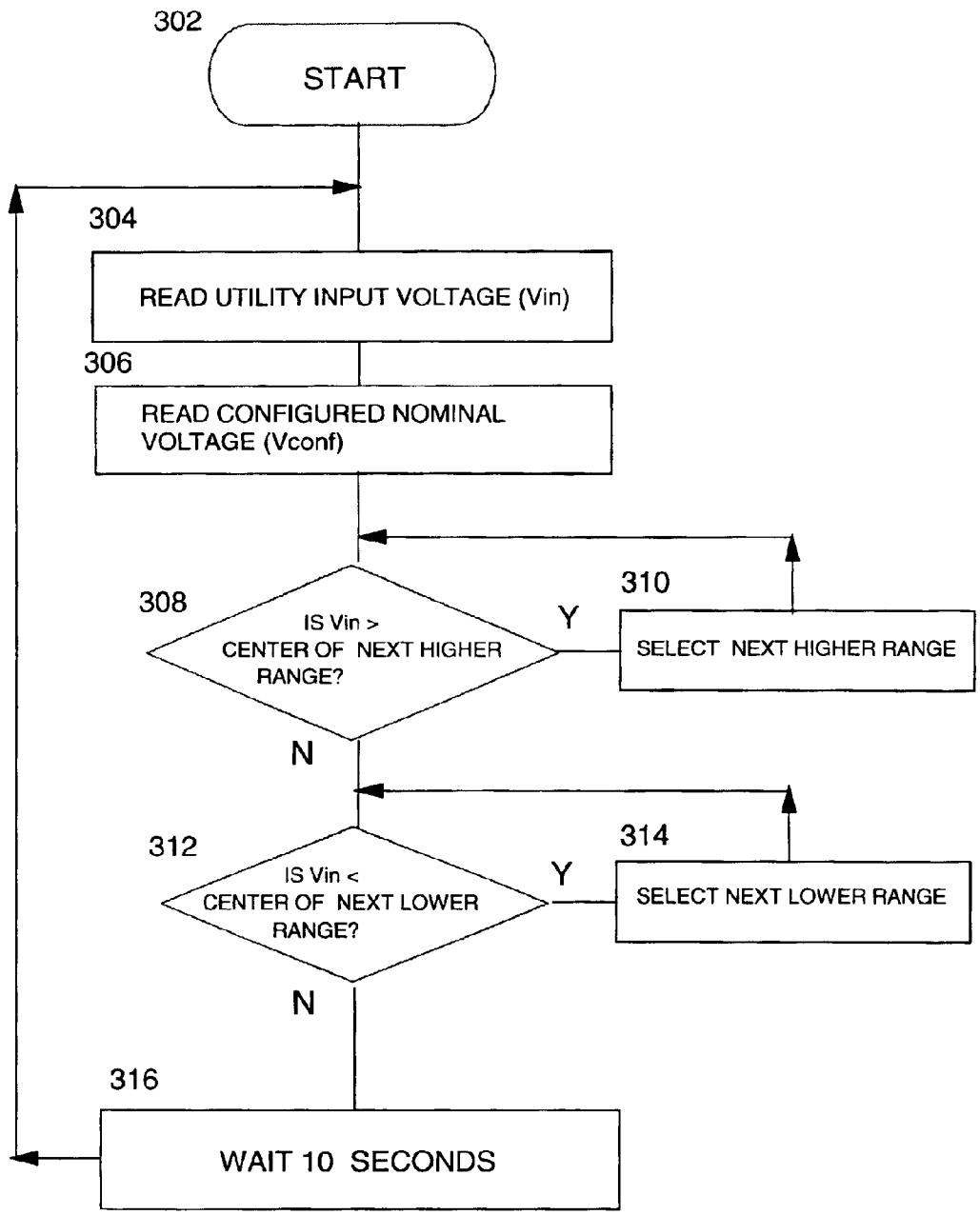
FIG. 2 shows a flow chart illustrating a method of configuring a power supply apparatus according to a preferred embodiment of the present invention.

FIG. 2 shows a flow chart illustrating a method of configuring a power supply apparatus according to a preferred embodiment of the present invention. The method steps begin at START 302. At step 304 the utility input voltage (Vin) is read, and at step 306, the presently configured nominal voltage of the device (input computer 104, for example) is read. At step 308, Vin is compared with the voltage value at the centre of the next higher range. If Vin is higher, at step 310 the next higher range is selected. At step 312, Vin is compared with the voltage value at the centre of the next lower range. If Vin is lower, at step 310 the next lower range is selected. At step 316, a wait of 10 seconds is initiated prior to the beginning of the next test-and-compare cycle. It will be clear to one skilled in the art that this wait could be of greater or lesser duration, depending upon other factors within the system, including, but not limited to, the temporal granularity required to adjust to changes in the input utility voltage supply.

Thus, the or each computer polls the UPS through the data link at regular intervals. As part of this poll the present nominal operating voltage and the measured utility voltage values are read by the computer. The computer may then, in a most preferred embodiment, apply the following tests and responses:

If the utility voltage is outside the range acceptable to the computer then no adjustment is made and the computer should shutdown before a subsequent UPS failure causes instant loss of power, otherwise:

If the utility voltage is greater than the centre-point of a higher range then switch to the highest range for which this is true.

If the utility voltage is less than the centre-point of a lower range then switch to the lowest range for which this is true.

If these tests result in a new operating voltage then a command is sent to the UPS via the data link to change the nominal operating voltage.

Should the ranges in a particular case need to be rather narrow, the problem of tracking jitter may be introduced into the system, whereby the system switches too rapidly in an attempt to follow relatively small changes in the input voltage. In such cases, the tests may preferably implement a hysteresis algorithm to avoid this problem of small variations in utility voltage causing unnecessary and repeated changes to the UPS's operating voltage. For simplicity the tests assume that the centre-point of each range is within both of the two adjacent ranges. If this is not the case then suitable thresholds should be chosen to retain the advantages of the selected hysteresis algorithm. Such choices of alternatives will be clearly understood by those of ordinary skill in the art, and do not need to be further described here.

The table below gives examples of the nominal operating voltages and acceptable input ranges (for safe bypass) that might be implemented by a UPS in accordance with an embodiment of the present invention. This is based on common utility supplies with a +/−10% range.

| Nominal | Range |
|---------|---------|
| 200 | 180–220 |
| 208 | 187–229 |
| 220 | 198–242 |
| 230 | 207–253 |
| 240 | 216–265 |

It will be clearly understood by one skilled in the art that these values are exemplary values only, and that many alternatives may be contemplated in variant embodiments of the present invention.

It will be appreciated that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system.

Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

However, the method is also suitable to be embodied in a logic arrangement permanently or temporarily established in a hardware apparatus in the form of firmware elements or logic elements of an ASIC.

It will be clear to one skilled in the art that many improvements and modifications can be made to the foregoing without departing from the spirit and scope of the present invention.

What is claimed is:

1. A system for configuring a power supply apparatus to supply a voltage optimized to tolerate a voltage range about a nominal operating voltage of a device, and comprising:
   a utility voltage test component operable to test and communicate to a comparison component a present utility voltage value;
   said comparison component operable to compare said present utility voltage value with a present nominal operating voltage value of said device;
   a configuring component in data communication with said comparison component and responsive to said present utility voltage value falling within an upper half of a first range having a centre point higher than said present nominal operating voltage value and lower than an upper out-of-tolerance voltage value of said device, configuring said power supply apparatus to supply power at a voltage within said first range; and
   said configuring component further responsive to said present utility voltage value falling within a lower half of a second range having a centre point lower than said present nominal operating voltage value and higher than a lower out-of-tolerance value of said device, configuring said power supply apparatus to supply power at a voltage within said second range.

2. A system as claimed in claim 1, and further comprising a hysteresis component for delaying operation of said configuring component until a threshold voltage value difference is signalled by said comparison component.

3. A system as claimed in claim 1, and wherein said power supply apparatus is an uninterruptible power supply.

4. A system as claimed in claim 1, and wherein said device comprises a data-processing device.

5. A system as claimed in claim 1, and wherein said power supply apparatus further comprises an alarm component operable to signal an alarm responsive to said present utility voltage value falling one of lower than said lower out-of-tolerance value and higher than said higher out of tolerance value.

6. A system as claimed in claim 1, and wherein said power supply apparatus further comprises a bypass circuit to connect said device directly to said utility supply voltage in case of failure of said power supply apparatus.

7. A method for configuring a power supply apparatus to supply a voltage optimized to tolerate a voltage range about a nominal operating voltage of a device, and comprising the steps of:
   testing by a utility voltage test component and communicating to a comparison component a present utility voltage value;
   comparing, by said comparison component, said present utility voltage value with a present nominal operating voltage value of said device;
   responsive to said present utility voltage value falling within an upper half of a first range having a centre point higher than said present nominal operating voltage value and lower than an upper out-of-tolerance voltage value of said device, configuring, by a configuring component, said power supply apparatus to supply power at a voltage within said first range; and
   responsive to said present utility voltage value falling within a lower half of a second range having a centre point lower than said present nominal operating voltage value and higher than a lower out-of-tolerance value of said device, configuring, by said configuring component, said power supply apparatus to supply power at a voltage within said second range.

8. A method as claimed in claim 7, and further comprising a step of delaying operation of said configuring component via a hysteresis algorithm until a threshold voltage value difference is signalled by said comparison component.

9. A method as claimed in claim 7, and wherein said power supply apparatus is an uninterruptible power supply.

10. A method as claimed in claim 7, and wherein said device comprises a data-processing device.

11. A method as claimed in claim 7, and wherein said power supply apparatus further comprises an alarm component operable to signal an alarm responsive to said present utility voltage value falling one of lower than said lower out-of-tolerance value and higher than said higher out of tolerance value.

12. A method as claimed in claim 7, and wherein said power supply apparatus further comprises a bypass circuit to connect said device directly to said utility supply voltage in case of failure of said power supply apparatus.

13. A computer program product, tangibly embodied in a computer-readable medium, for configuring a power supply apparatus to supply a voltage optimized to tolerate a voltage range about a nominal operating voltage of a device, and comprising the computer program code steps of:
   testing by a utility voltage test component and communicating to a comparison component a present utility voltage value;

comparing, by said comparison component, said present utility voltage value with a present nominal operating voltage value of said device;

responsive to said present utility voltage value falling within an upper half of a first range having a centre point higher than said present nominal operating voltage value and lower than an upper out-of-tolerance voltage value of said device, configuring, by a configuring component, said power supply apparatus to supply power at a voltage within said first range; and responsive to said present utility voltage value falling within a lower half of a second range having a centre point lower than said present nominal operating voltage value and higher than a lower out-of-tolerance value of said device, configuring, by said configuring component, said power supply apparatus to supply power at a voltage within said second range.

14. A computer program product as claimed in claim 13, and further comprising a computer program code step of delaying operation of said configuring component via a hysteresis algorithm until a threshold voltage value difference is signalled by said comparison component.

15. A computer program product as claimed in claim 14, and wherein said power supply apparatus is an uninterruptible power supply.

16. A method as claimed in claim 14, and wherein said device comprises a data-processing device.

17. A computer program product as claimed in claim 14, and wherein said power supply apparatus further comprises an alarm component operable to signal an alarm responsive to said present utility voltage value falling one of lower than said lower out-of-tolerance value and higher than said higher out of tolerance value.

18. A computer program product as claimed in claim 14, and wherein said power supply apparatus further comprises a bypass circuit to connect said device directly to said utility supply voltage in case of failure of said power supply apparatus.

* * * * *